United States Patent
Ishii et al.

(10) Patent No.: US 9,430,203 B2
(45) Date of Patent: Aug. 30, 2016

(54) INFORMATION PROCESSING APPARATUS AND COMPILATION METHOD

(71) Applicant: FUJITSU LIMITED, Kawasaki-shi, Kanagawa (JP)

(72) Inventors: Kuninori Ishii, Odawara (JP); Masanori Yamanaka, Chigasaki (JP); Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 14/522,815

(22) Filed: Oct. 24, 2014

(65) Prior Publication Data

US 2015/0135171 A1    May 14, 2015

(30) Foreign Application Priority Data

Nov. 8, 2013  (JP) .................... 2013-231957

(51) Int. Cl.
*G06F 9/45* (2006.01)

(52) U.S. Cl.
CPC ............. *G06F 8/452* (2013.01); *G06F 8/4441* (2013.01)

(58) Field of Classification Search
CPC ...... G06F 8/447; G06F 8/452; G06F 8/4441; G06F 9/5016; G06F 9/3855; G06F 9/325
See application file for complete search history.

(56) References Cited

U.S. PATENT DOCUMENTS

| | | | |
|---|---|---|---|
| 5,293,631 A | 3/1994 | Rau et al. | |
| 5,742,814 A * | 4/1998 | Balasa | G06F 9/5016 |
| 6,282,704 B1 * | 8/2001 | Iitsuka | G06F 8/452 717/150 |
| 6,519,765 B1 | 2/2003 | Kawahito et al. | |
| 2003/0204839 A1 * | 10/2003 | Kawahito | G06F 8/4441 717/130 |
| 2009/0083724 A1 * | 3/2009 | Eichenberger | G06F 8/447 717/160 |

FOREIGN PATENT DOCUMENTS

| | | |
|---|---|---|
| JP | 02-148330 | 6/1990 |
| JP | 05-197563 | 8/1993 |
| JP | 2000-081983 | 3/2000 |

OTHER PUBLICATIONS

William Pugh., "A Practical Algorithm for Exact Array Dependency Analysis", Aug. 1992, pp. 102-114 <Eada_Pugh92.pdf>.*
Le Fur, "Scanning parameterized polyhedron using Fourier-Motzkin elimination" 1996, p. 445-460 <LeFur_FM96.pdf>.*
Alexander Schrijver, "Theory of Linear and Integer Programming", John Wiley & Sons, pp. 154-157 (1998) (12 pages).

* cited by examiner

*Primary Examiner* — Tuan Vu
(74) *Attorney, Agent, or Firm* — Fujitsu Patent Center

(57) ABSTRACT

A storage unit stores source code including loop processing that is written with an array referenced by an index, a loop variable, and a parameter. A computing unit generates a conditional expression indicating that the index of the array satisfies a predetermined condition, using the loop variable and the parameter. The computing unit generates determination information on the parameter, by eliminating the loop variable from the conditional expression through formula manipulation. Then, the computing unit generates object code corresponding to the source code in accordance with the determination information.

7 Claims, 11 Drawing Sheets

SOURCE CODE

```
/* A: array with indices 0 to 99 */
int A[100];
/* M: constant parameter in the loop */
int M = ···;
/* loop variable */
int i, j;

for (i=0; i<=3; i++) { for (j=i; j<=min(-i+7, i+3); j++) {
        A[i-2j+M] = ···;
    }

}
```

CHECK CODE

```
/* index checking in the loop */
if (i-2j+M>=100 || i-2j+M<=-1) {
    /* error processing */
}
```

```
/* index checking before the loop */
if (M>=100 || M<=7) {
    /* error processing */
}
```

SOURCE CODE

```
/* B: two-dimensional array */
int B[100,100];
/* N, X, Y: constant parameter in the loop */
int N = ···;  int X = ···;  int Y = ···;
/* loop variable */
int i, j;

for (i=0; i<=N-1; i++) {
/* parallelization directive */
!ocl parallel
    for (j=0; j<=N-1; j++) {
        B[i, j+X] = B[i, j+Y] + 10;
    }
}
```

CHECK CODE

```
/* parallelization checking */
if ((X-Y>=1 && X-Y<=N-1) ||
            (X-Y>=1-N && X-Y<=-1)) {
    /* error processing */
}
```

CHECK CODE

```
/* index checking before the loop */
if (1<=Z && L<=Z) {
    /* error processing */
}
/* parallelization checking */
if (1<=Z && L-1<=2Z) {
    /* error processing */
}
```

CHECK CODE

```
/* checking before the loop */
if (1<=Z) {
    if (L<=Z) {
        /* index error processing */
    }
    if (L-1<=2Z) {
        /* parallelization error processing */
    }
}
```

INFORMATION PROCESSING APPARATUS AND COMPILATION METHOD

CROSS-REFERENCE TO RELATED APPLICATION

This application is based upon and claims the benefit of priority of the prior Japanese Patent Application No. 2013-231957, filed on Nov. 8, 2013, the entire contents of which are incorporated herein by reference.

FIELD

The embodiments discussed herein are related to an information processing apparatus and a compilation method.

BACKGROUND

When developing computer software, developers often use a high-level language, such as C or the like, as a programming language. Source code written in a high-level language may be converted by a compiler into object code that is executable by a processor. Many compilers provide not only a function of checking syntax errors in source code, but also a function of checking semantic errors which lead to an improper operation such as memory access violation and the like.

A semantic error may occur in association with a reference to an array. An array is a data structure capable of storing multiple data elements. The entire array is specified by a variable (an array variable), and each data element in the array is specified by an index. The array is often used in loop processing for performing similar operations on multiple data elements. An example of a semantic error associated with a reference to an array is as follows. An array is referenced using an index value outside the declared range, so that a wrong memory area is accessed. Another example is as follows. When an operation of storing a data element by specifying an index value and an operation of acquiring a data element by specifying the same index value are parallelized, the execution order of the two operations is not controlled, so that the intended processing results might not be achieved.

If it is obvious from source code that an array reference causes an improper operation, the compiler may display an error message, and may stop compilation without generating object code (static checking at compilation time). On the other hand, if it is not known at compilation time whether an array reference causes an improper operation, such as when an array reference is dependent on a parameter value which is determined at run time, the compiler often inserts check code into the object code. The check code checks whether the processing may proceed, based on the parameter value at run time and the like, before an improper operation occurs (for example, before referring to an array using an index value outside the declared range) (dynamic checking at run time).

For example, there has been proposed a method of checking improper use of index. According to this checking method, a compiler acquires source code in which a loop variable I for controlling the number of iterations of a loop varies from an initial value M to a final value N, and in which an array A is referenced in the loop by using an index I×4−3. The initial value M and the final value N are parameters whose values are determined at run time. Thus, the compiler generates a subroutine for checking whether the index value when the loop variable I=the initial value M and the index value when the loop variable I=the final value N are within the declared range. Then, the compiler generates object code in which this subroutine is called immediately before the loop.

Further, for example, there has been proposed an optimization method using a compiler. According to this optimization method, a compiler determines whether two operations are independent (neither uses the result of the other operation). If the two operations are determined to be independent, an attempt is made to parallelize the two operations. For determining the independence, the compiler detects a loop written with an array X, a loop variable J, and constants a1, a2, b1, and b2. It is assumed that, in this loop, a reference to the array X using an index a1×J+b1 and a reference to the array X using an index a2×J+b2 are close. Then, the compiler determines whether (a1−a2)×J+(b1−b2)=0 holds for an arbitrary loop variable J, and thereby examines the likelihood that the two indices refer to the same data element.

Please see, for example, Japanese Laid-open Patent Publication (JP-A) No. 2-148330; Japanese Laid-open Patent Publication (JP-A) No. 5-197563; and Alexander Schrijver, "Theory of Linear and Integer Programming", John Wiley & Sons, pp. 155-157, Jun. 4, 1998.

However, the methods disclosed in JP-A No. 2-148330 and JP-A No. 5-197563 are applicable to a relatively simple array reference in which each of the initial value and the final value of the loop variable is expressed by a constant or a single parameter and in which the index of the array is expressed by a primary expression including the single loop variable. It is difficult to apply the methods disclosed in JP-A No. 2-148330 and JP-A No. 5-197563 to a relatively complex array reference in which the loop is a multi-loop including multiple loop variables, or in which the definition of the variation range of the loop variable is complex. That is, with these methods, it is not always possible to check, for an arbitrary loop, whether there is improper use of index, whether parallelization is possible, or the like. Accordingly, the items that may be verified before loop processing are limited.

SUMMARY

According to one aspect of the invention, there is provided an information processing apparatus that includes: a memory configured to store source code including loop processing, the loop processing being written with an array referenced by an index, a loop variable, and a parameter other than the loop variable; and a processor configured to execute a process. The process includes: generating a conditional expression indicating that the index of the array satisfies a predetermined condition, using the loop variable and the parameter; generating determination information on the parameter, by eliminating the loop variable from the conditional expression through formula manipulation; and generating object code corresponding to the source code in accordance with the determination information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
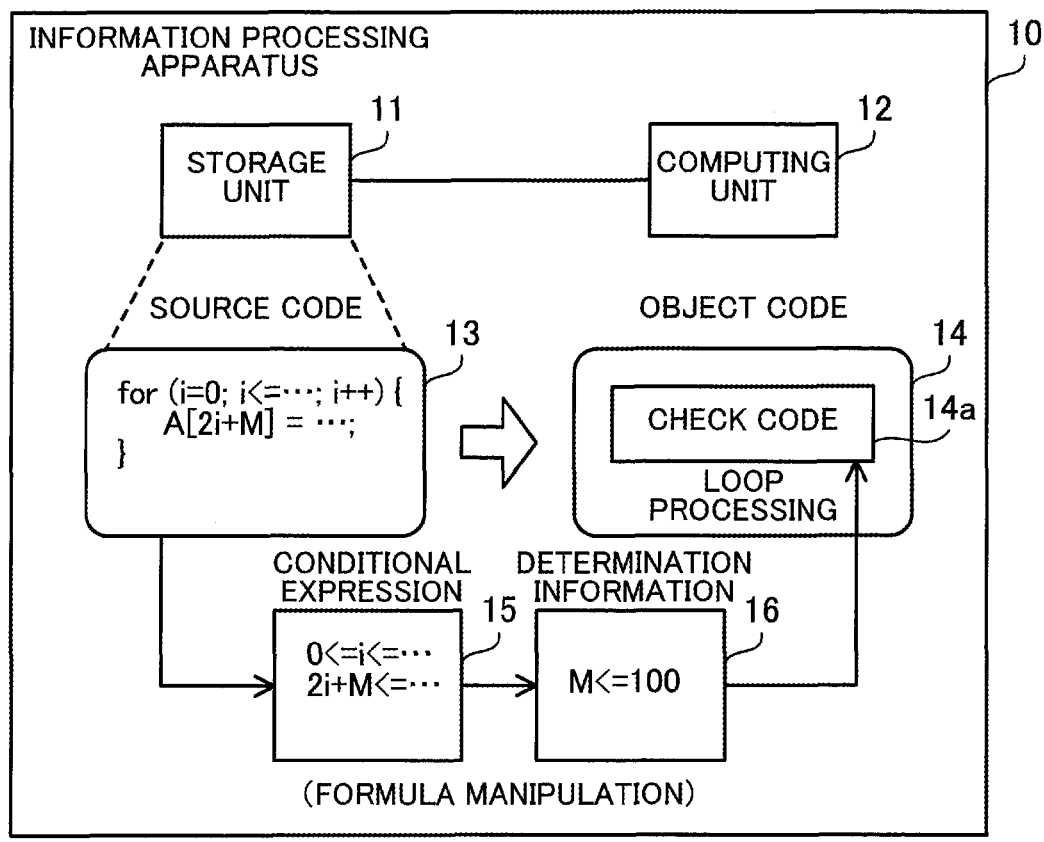
FIG. 1 illustrates an information processing apparatus according to a first embodiment.

Several embodiments will be described below with reference to the accompanying drawings, wherein like reference numerals refer to like elements throughout.

First Embodiment

FIG. 1 illustrates an information processing apparatus 10 according to a first embodiment.

The information processing apparatus 10 of the first embodiment compiles source code 13 to generate object code 14. The information processing apparatus 10 may be a terminal apparatus that is operated by the user, or may be a server that is accessed by a terminal apparatus via a network. The information processing apparatus 10 may be referred to as a "computer".

The information processing apparatus 10 includes a storage unit 11 and a computing unit 12. The storage unit 11 may be a volatile storage device such as a random access memory (RAM) and the like, or may be a non-volatile storage device such as a hard disk drive (HDD) and the like. The computing unit 12 is a processor, for example. The processor may be a central processing unit (CPU) or a digital signal processor (DSP), and may include an integrated circuit such as an application specific integrated circuit (ASIC), a field programmable gate array (FPGA), and the like. The processor executes a program stored in the RAM, for example. A program for realizing compilation processing (described below) may be referred to as a compiler program. The "processor" may be a set of two or more processors (multiprocessor).

The storage unit 11 stores the source code 13. The source code 13 may be input to the information processing apparatus 10 by the user, or may be received by the information processing apparatus 10 from another information processing apparatus. The source code 13 includes code for loop processing.

The loop processing is written with an array A referenced by an index, a loop variable i, and a parameter M. A reference to the array A may be either an operation of storing a data element in the array A or an operation of acquiring a data element from the array A. The number of data elements of the array A is declared when defining the array A in the source code 13. The loop variable i is a variable for controlling the number of iterations of the loop processing.

In the case of nested loop processing, multiple loop variables may be used. The parameter M is a variable whose value is not determined statically (at compilation time), but is determined dynamically (at run time). The value of the parameter M is calculated by the time immediately before the loop processing, and does not change during the loop processing. The index of the array A is not a constant, and is represented as a linear expression including the loop variable, such as 2i+M, for example. The parameter M may be used for representing at least one of the range of values of the loop variable and the index.

The computing unit 12 acquires the source code 13 from the storage unit 11, and generates the object code 14. In this step, the computing unit 12 generates a conditional expression 15 indicating that the index of the array A satisfies a predetermined condition, using the loop variable i and the parameter M. The conditional expression 15 includes, for example, one or more first expressions indicating the variation range of the loop variable (bounds of the value of the loop variable), and a second expression related to the predetermined condition. The first expression may include the parameter M, and may be a linear inequality for the loop variable i. The second expression may be a linear equation or a linear inequality for the loop variable i.

The predetermined condition may indicate, for example, that the index value of the array A is in its domain, or that the index value of the array A is not within its domain. The domain of the index is a range of the index value pointing to the inside of the memory area that is reserved when the array A is defined. When the index value is not within the domain, it means that the index value points to the outside of the memory area for the array A, and unauthorized memory access occurs. Further, the predetermined condition may indicate, for example, that operations corresponding to different values (i=i0 and i=i1) of the loop variable i are parallelizable, or that these operations are not parallelizable. The index used when i=i0 and the index used when i=i1 might have the same value. Thus, if at least one of a reference to the array A when i=i0 and a reference to the array A when i=i1 is an operation of storing a data element, parallelization is not possible.

When the conditional expression 15 is generated, the computing unit 12 eliminates the loop variable from the conditional expression 15 through formula manipulation, and thus generates determination information 16 on the parameter M. The determination information 16 may indicate the range of values of the parameter M when the conditional expression 15 holds. If the value of the parameter M that is determined at run time is within this range, the index of the array A satisfies the predetermined condition. However, if the conditional expression 15 always holds or never holds regardless of the value of the parameter M, there may a case where the determination information 16 does not indicate the range of values of the parameter M.

As formula manipulation, an operation called "projection" may be used. Projection is an operation for transforming high-dimensional information into low-dimensional information. In projection, the relationship between n variables including a loop variable and a parameter is represented in an n-dimensional space. Then, light is projected in the axial direction corresponding to a given variable, thereby casting a shadow in an (n−1)-dimensional space. Thus, it is possible to eliminate the given variable. One example of algorithms for realizing projection is the Fourier-Motzkin elimination method. This algorithm is described in, for example, Alexander Schrijver, "Theory of Linear and Integer Programming", John Wiley & Sons, pp. 155-157, Jun. 4, 1998.

When the determination information 16 is generated, the computing unit 12 generates the object code 14 corresponding to the source code 13 in accordance with the determination information 16. For example, if the determination information 16 indicates the range of values of the parameter M, the computing unit 12 generates check code 14a that checks whether the value of the parameter M at run time is within the range. Then, the computing unit 12 inserts the check code 14a before the loop processing (for example, immediately before the loop processing) in the object code 14. Thus, it is possible to perform error processing, such as stopping execution of the object code 14 or the like, before an improper operation occurs. Further, for example, if the determination information 16 indicates that the conditional expression 15 always holds (or never holds), the computing unit 12 outputs warning information indicating a compilation error. In this case, the object code 14 does not have to be generated.

According to the information processing apparatus 10 of the first embodiment, the conditional expression 15 indicating that a reference to the array A in a loop satisfies a predetermined condition is generated, using the loop variable i and the parameter M whose value is determined at run time. Then, by using formula manipulation such as projection or the like, the loop variable i is eliminated from the conditional expression 15, and the determination information 16 on the parameter M is generated. Based on this determination information 16, the object code 14 is generated that checks the value of the parameter M before loop processing, for example. Accordingly, even if the loop definition, such as the variation range of the loop variable i, the index of the array A, and the like, is complex, it is possible to calculate the condition of the parameter M by using formula manipulation. Thus, it is possible to increase the number of items that may be checked before the loop processing.

Second Embodiment

An information processing apparatus 100 of a second embodiment generates executable code from source code written in a high-level language such as C and the like, using a compiler and a linker.

Figure 2:
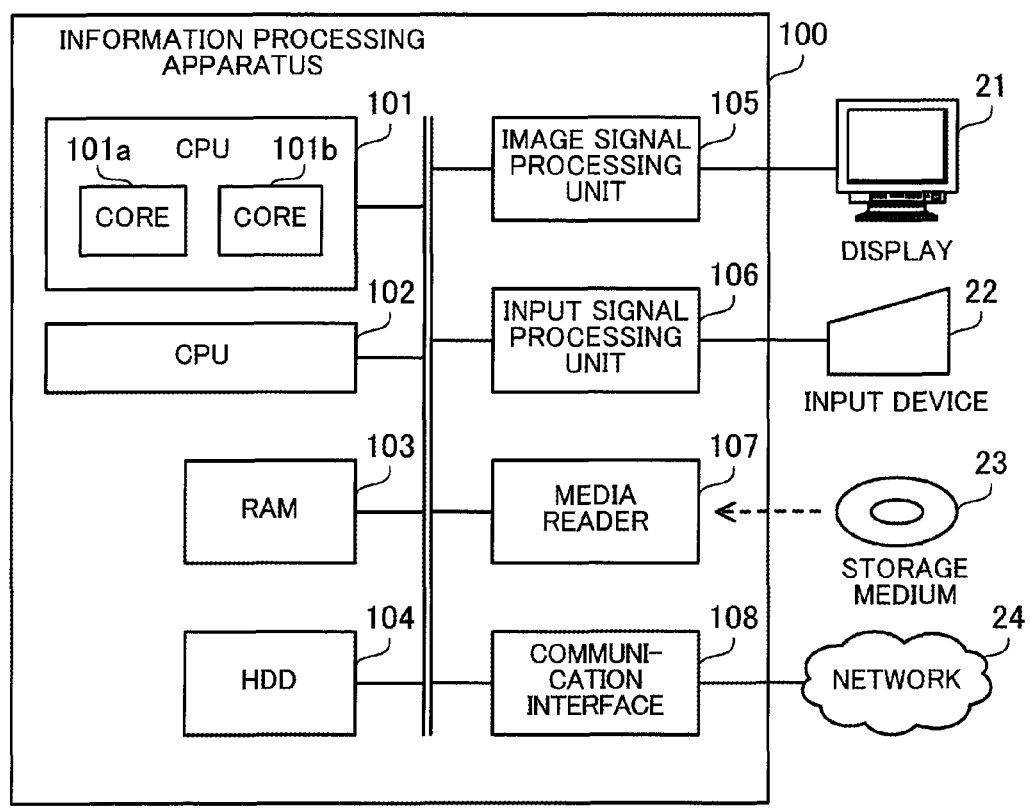
FIG. 2 is a block diagram illustrating an example of hardware of the information processing apparatus.

FIG. 2 illustrates an exemplary hardware configuration of the information processing apparatus 100.

The information processing apparatus 100 includes CPUs 101 and 102, a RAM 103, an HDD 104, an image signal processing unit 105, an input signal processing unit 106, a media reader 107, and a communication interface 108. These hardware units are connected to a bus within the information processing apparatus 100. The CPUs 101 and 102 are examples of the computing unit 12 of the first embodiment, and the RAM 103 or the HDD 104 is an example of the storage unit 11 of the first embodiment.

Each of the CPUs 101 and 102 is a processor including one or more cores that execute instructions of a program. For example, the CPU 101 includes cores 101a and 101b. Multiple cores of the same CPU or different CPUs are able to execute instructions in parallel. Each of the CPUs 101 and 102 loads at least part of a program and data stored in the HDD 104 into the RAM 103 so as to execute the program. Note that each core may be referred to as a "processor", or a set of multiple processors may be referred to as a "processor" (multiprocessor).

The RAM 103 is a volatile memory that temporarily stores a program executed by the CPUs 101 and 102 and data used for processing by the CPUs 101 and 102. The information processing apparatus 100 may include other types of memories than a RAM, and may include a plurality of memories.

The HDD 104 is a non-volatile storage device that stores software programs (such as an operation system (OS), application software, and so on) and data. The information processing apparatus 100 may include other types of storage devices such as a flash memory, a solid state drive (SSD), and the like, and may include a plurality of non-volatile storage devices.

The image signal processing unit 105 outputs an image to a display 21 connected to the information processing apparatus 100, in accordance with instructions from the CPUs 101 and 102. Examples of the display 21 include cathode ray tube (CRT) displays, liquid crystal displays (LCDs), plasma display panels (PDPs), organic electro-luminescence (OEL) displays, and the like.

The input signal processing unit 106 obtains an input signal from an input device 22 connected to the information processing apparatus 100, and outputs the input signal to at least one of the CPUs. Examples of the input device 22 include pointing devices (such as a mouse, a touch panel, a touch pad, a trackball, and so on), keyboards, remote controllers, button switches, and the like. A plurality of types of input devices may be connected to the information processing apparatus 100.

The media reader 107 is a reading device that reads a program and data stored in a storage medium 23. Examples of the storage medium 23 include magnetic discs (such as a flexible disk (FD), an HDD, and so on), optical discs (such as a compact disc (CD), a digital versatile disc (DVD), and so on), magneto-optical discs (MOs), semiconductor memories, and the like. The media reader 107 reads, for example, a program and data from the storage medium 23, and stores the read program and data in the RAM 103 or the HDD 104.

The communication interface 108 is connected to a network 24, and is an interface that communicates with other information processing apparatuses via the network 24. The communication interface 108 may be a wired communication interface connected to a communication apparatus such as a switch with a cable, or may be a radio communication interface connected to a base station via a radio link.

Note that the information processing apparatus 100 may include only one CPU. Further, the information processing apparatus 100 does not have to include the media reader 107. Further, in the case where the information processing apparatus 100 is controlled by a terminal apparatus operated by the user via the network 24, the information processing apparatus 100 does not have to include the image signal processing unit 105 or the input signal processing unit 106. Further, the information processing apparatus 100 does not have to include the communication interface 108. Further, the display 21 and the input device 22 may be integrally formed with the housing of the information processing apparatus 100.

Next, a description will be given of a checking function of a compiler according to the second embodiment.

Figure 3:
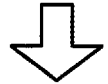
FIG. 3 illustrates an example of index checking at run time.

FIG. 3 illustrates an example of index checking at run time.

Here, it is assumed that the information processing apparatus 100 compiles the following source code. The source code defines an array A of 100 data elements, a parameter M having a value that is dynamically determined before the loop and does not change within the loop, and loop variables i and j. The normal range of the index of the array A is 0 to 99.

The loop has a double-loop structure (a nested structure). The loop variable i is used for controlling the number of iterations of the outer loop, while the loop variable j is used for controlling the number of iterations of the inner loop. As for the outer loop, the initial value of the loop variable i is a constant 0; the final value of the loop variable i is a constant 3; and the incremental step of the loop variable i is a constant 1. As for the inner loop, the initial value of the loop variable j is i; the final value of the loop variable j is the smaller one of −i+7 and i+3; and the incremental step of the loop variable j is a constant 1. That is, the initial value and the final value of the loop variable j of the inner loop are dependent on the loop variable i of the outer loop. In the inner loop, the data element of the array A indicated by an index i−2j+M is updated. That is, the reference to the array A is dependent on the loop variables i and j, and the parameter M.

In order to prevent memory access violation when executing this loop processing, the value of the index i−2j+M needs to be in the range of 0 to 99. On the other hand, the value of the parameter M is determined at run time, and therefore it is difficult to statically check at compilation time whether a memory access violation occurs. Accordingly, the information processing apparatus 100 inserts check code for dynamically checking at run time whether a memory access violation occurs into the executable code.

A first checking method may be to check the index using a determination expression representing that the value of i−2j+M is greater than or equal to 100 or is less than or equal to −1, immediately before the array A is referenced in the inner loop. If this determination expression is satisfied, the reference to the array A causes a memory access violation. Therefore, error processing is performed such as force-quitting the program and the like. However, with the first checking method, the check code is executed the same number of times as the number of iterations of the loop. Therefore, the overhead of the loop processing is increased, which is likely to reduce the execution efficiency of the program.

A second checking method may be to check the index using a determination expression representing that the value of the parameter M is greater than or equal to 100 or is less than or equal to 7, immediately before the outer loop starts. This determination expression represents a condition of the parameter M which makes the value of the index i−2j+M fall outside the range of 0 to 99 when the values of the loop variables i and j vary. If this determination expression is satisfied, error processing is performed such as force-quitting the program and the like. Since this determination expression does not include the loop variables i and j, it is possible to check whether the value of the index i−2j+M is outside the range of 0 to 99, before the outer loop starts. That is, with the second checking method, it is possible to reduce the number of times that the check code is executed compared to that with the first checking method. Therefore, the overhead of the loop processing is reduced, which makes it possible to minimize reduction in the execution efficiency of the program. The information processing apparatus 100 generates executable code based on the second checking method.

Note that the check code of FIG. 3 uses a determination expression indicating that the value of the index i−2j+M is outside the range of 0 to 99, and defines that error processing is performed if the determination expression is satisfied.

Figure 4:
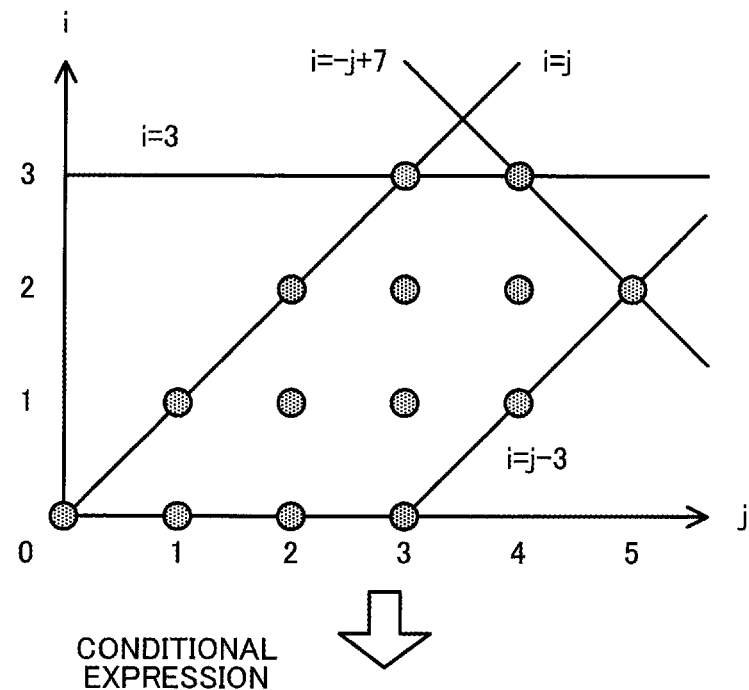
FIG. 4 illustrates an example of a method of calculating a determination expression for index checking.

FIG. 4 illustrates an example of a method of calculating a determination expression for index checking.

The determination expression (the value of the parameter M is greater than or equal to 100 or is less than or equal to 7) illustrated in FIG. 3 may be obtained from a conditional expression illustrated in FIG. 4 through formula manipulation. The conditional expression includes loop variable conditions that limit the variation ranges of the loop variables i and j, and an error condition indicating that the value of the index i−2j+M causes a memory access violation.

The loop variable conditions are defined as follows based on the loop definition descried in the source code. The value of the loop variable i is greater than or equal to the constant 0 and is less than or equal to the constant 3. The value of the loop variable j is greater than or equal to the value of the loop variable i. The value of the loop variable j is less than or equal to −i+7 and is less than or equal to i+3. The variation range of these loop variables i and j may be represented as an region in the two-dimensional space with axes corresponding to the loop variables i and j. As illustrated in FIG. 4, the values of the loop variables i and j vary within a pentagonal region. More specifically, there are 14 patterns for (i, j): (0, 0), (0, 1), (0, 2), (0, 3), (1, 1), (1, 2), (1, 3), (1, 4), (2, 2), (2, 3), (2, 4), (2, 5), (3, 3), and (3, 4).

The error condition is defined as follows based on the array definition and array reference descried in the source code. The value of the index i−2j+M is greater than or equal to 100 or is less than or equal to −1.

The information processing apparatus 100 may eliminate the loop variables i and j from this conditional expression through formula manipulation, and thus generates a determination expression for the parameter M. As formula manipulation, an algorithm called "projection" such as the Fourier-Motzkin elimination method or the like may be used. It is assumed that a region that satisfies the above conditional expression is formed in a three-dimensional space with axes corresponding to the loop variables i and j and the parameter M. Projection refers to casting a shadow in the space corresponding to the parameter M by projecting light in the axial directions corresponding to the loop variables i and j. With this projection, it is possible to eliminate the loop variables i and j, and thus to calculate the range of values that the parameter M may take.

According to the Fourier-Motzkin elimination method, projection is realized with the following calculation procedure, for example. It is assumed that there is an n-dimensional simultaneous inequality represented using variables x1, x2, . . . , and xn, including a loop variable and a parameter. Then, it is assumed that an (n−1)-dimensional simultaneous inequality is obtained by eliminating an m-th variable xm from the n-dimensional simultaneous inequality by performing projection.

First, an inequality that defines at least one of the maximum value and the minimum value of the variable xm is extracted from the n-dimensional simultaneous inequality. Then, a new inequality not including the variable xm is generated for all the combinations of inequalities that define the maximum value and the minimum value. For example, it is assumed that one of the inequalities defining the maximum value is a×xm<=U (a is a constant, and U is a linear expression not including the variable xm), and one of the inequalities defining the minimum value is L<=b×xm (L is a linear expression not including the variable xm, and b is a constant). Then, a×L<=a×b×xm<=b×U holds. Accordingly, it is possible to generate a new inequality a×L<=b×U from a combination of these two inequalities. By combining the newly generated inequality and an inequality not including the variable xm in the original n-dimensional simultaneous inequality, it is possible to obtain an (n−1)-dimensional simultaneous inequality in which the variable xm is eliminated.

Note that in the second embodiment, in order to easily calculate a determination expression from a conditional expression using projection, it is assumed that the region formed in the n-dimensional space is a convex polyhedron. A convex polyhedron is a region defined by a finite number of linear inequalities, and is a polyhedron in which all the faces are convex polygons (polygons in which all the interior angles are less than 180 degrees). In the case where the initial value and the final value of the loop variable are represented by a linear expression including the loop variable of the outer loop, a parameter, and a constant; the incremental step of the loop variable is a constant; and the index is represented by a linear expression including the loop variable, a parameter, and a constant, the region formed in the n-dimensional space is a convex polyhedron. Accordingly, the information processing apparatus 100 is able to generate, for a loop with a loop variable and an index that satisfy these conditions, check code for checking an array reference in the loop by using projection.

Figure 5:
FIG. 5 illustrates an example of parallelization checking at run time.

FIG. 5 illustrates an example of parallelization checking at run time.

Here, it is assumed that the information processing apparatus 100 compiles the following source code which is different from that of FIG. 3. The source code defines an array B which is a two-dimensional array of 100×100 data elements, parameters N, X, and Y each having a value that is dynamically determined before the loop and does not change within the loop, and loop variables i and j.

The loop has a nested structure. The loop variable i is used for controlling the number of iterations of the outer loop, while the loop variable j is used for controlling the number of iterations of the inner loop. As for the outer loop, the initial value of the loop variable i is a constant 0; the final value of the loop variable i is N−1; and the incremental step of the loop variable i is a constant 1. As for the inner loop, the initial value of the loop variable j is a constant 0; the final value of the loop variable j is N−1; and the incremental step of the loop variable j is a constant 1. In the inner loop, the data element of the array B indicated by an index i, j+Y is acquired, and the data element of the array B indicated by an index i, j+X is updated. That is, the reference to the array B is dependent on the loop variables i and j and the parameters X and Y.

Further, in the inner loop, a parallelization directive (!ocl parallel) is added. The instruction following the parallelization directive is executed in parallel using multiple CPUs (for example, the CPUs 101 and 102) or multiple cores (for example, the cores 101a and 101b). By adding a parallelization directive, the user is able to forcibly parallelize commands that are not easily parallelized by automatic optimization using the compiler. The parallelization directive added to the inner loop in FIG. 5 is to parallelize operations corresponding to different values of the loop variable j.

However, parallelization of an array reference in the loop might cause an improper operation. For example, it is assumed that the value of the parameter N is 2 or greater, and the values of the parameter X and Y have a relationship of X=Y+1. In this case, the value of B[0, 1+Y] is calculated based on the value of B[0, Y], and the value of B[0, 2+Y] is calculated based on the value of B[0, 1+Y]. That is, the operation of j=1 is executed using the result of the operation of j=0, and hence there is a dependency between the operation of j=0 and the operation of j=1. Then, if the operations having a dependency are parallelized, the execution order is not guaranteed, and hence an improper operation might occur.

In the second embodiment, if operations corresponding to different variables of the loop variable j are dependent on each other, the loop processing is determined not to be parallelizable. There may be dependency between writing a data element to and reading a data element from the same array, and between writing a data element to and writing another data element to the same array. On the other hand, whether parallelization is possible depends on the parameters N, X, and Y, whose values are determined at run time, and therefore it is difficult to statically check whether parallelization is possible at compilation time. Accordingly, the information processing apparatus 100 inserts, for a loop with a parallelization directive, check code for dynamically checking at run time whether the loop may be parallelized, into the executable code.

For example, whether parallelization is possible may be checked immediately before the inner loop starts, using a determination expression representing that X−Y is greater than or equal to 1 and is less than or equal to N−1, or X−Y is greater than or equal to 1−N and is less than or equal to −1. This determination expression represents conditions of the parameter N, X, and Y which make the range of values of the index i, j+X and the range of values of the index i, j+Y overlap each other when the values of the loop variables i and j vary. If this determination expression is satisfied, error processing is performed such as force-quitting the program and the like. Since this determination expression does not include the loop variables i and j, it is possible to check whether parallelization is possible, before the inner loop starts.

Note that the check code of FIG. 5 uses a determination expression representing that parallelization is not possible, and defines that error processing is performed if the determination expression is satisfied.

Figure 6:
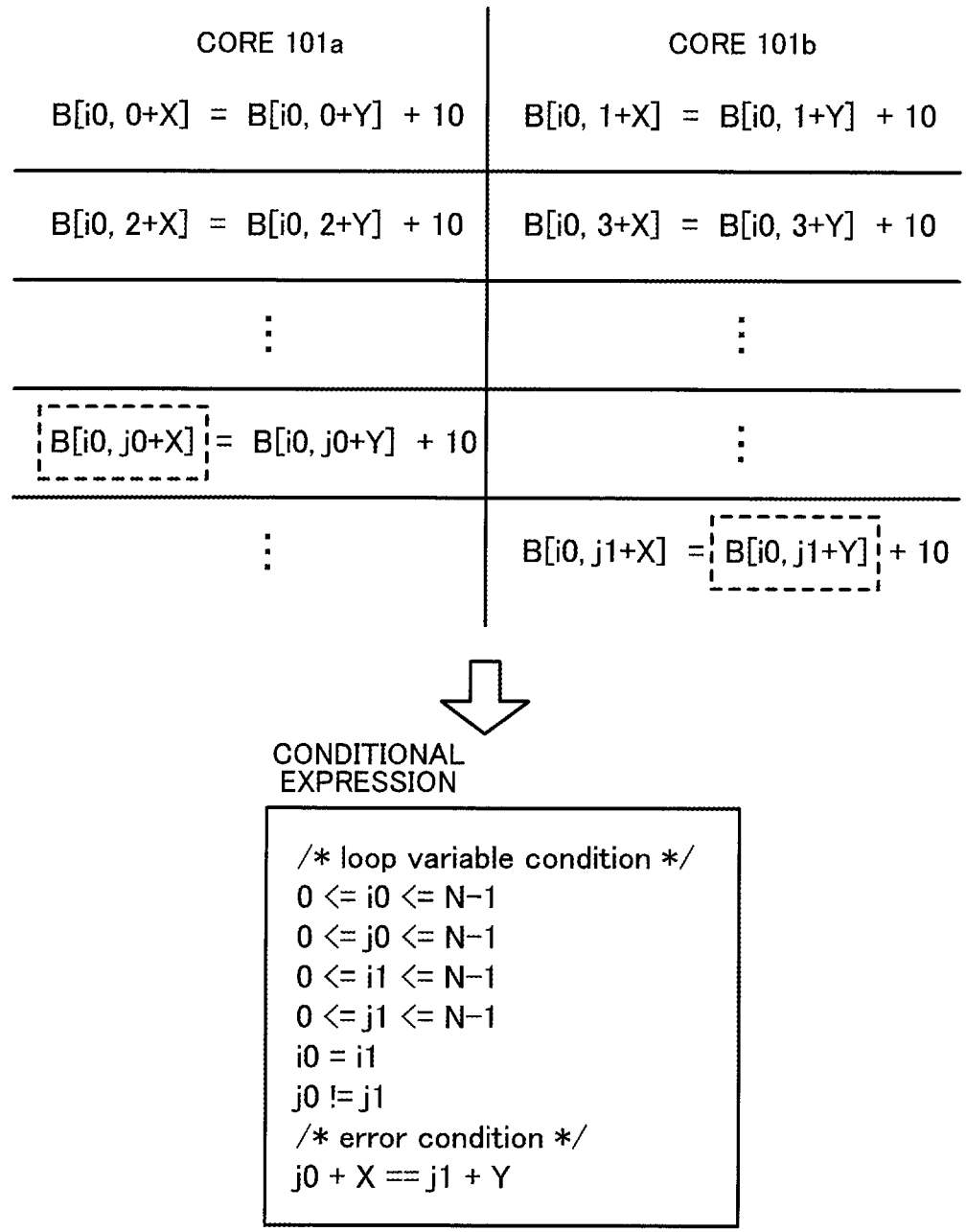
FIG. 6 illustrates an example of a method of calculating a determination expression for parallelization checking.

FIG. 6 illustrates an example of a method of calculating a determination expression for parallelization checking.

As one example of parallelization, when i=i0, the core 101a may execute even-numbered operations (j=0, 2, . . . ) of the inner loop, and the core 101b may execute odd-numbered operations (j=1, 3, . . . ) in parallel with the core 101a. The core 101a acquires a data element of B[i0, 0+Y] so as to update a data element of B[i0, 0+X], and also acquires a data element of B[i0, 2+Y] so as to update a data element of B[i0, 2+X]. The core 101b acquires a data element of B[i0, 1+Y] so as to update a data element of B[i0, 1+X], and also acquires a data element of B[i0, 3+Y] so as to update a data element of B[i0, 3+X]. The execution order is not guaranteed between the even-numbered operations executed by the core 101a and the odd-numbered operations executed by the core 101b. That is, the operation of j=2 by the core 101a is not always executed after the operation of j=1 by the core 101b.

Here, it is assumed that the core 101a executes the operation of j=j0 of the inner loop when i=i0, and the core 101b executes the operation of j=j1 when i=i1=i0. The values i0 and i1 are arbitrary values that the loop variable i may take, and j0 and j1 are arbitrary values that the loop variable j may take. Parallelization of the inner loop is possible only in the case where the value (i0, j0+X) of the index i, j+X in which i=i0 and j=j0 is not equal to the value (i1, j1+Y) of the index i, j+Y in which i=i1=i0 and j=j1.

Thus, the determination expression for the parameters N, X, and Y illustrated in FIG. 5 may be obtained from a conditional expression illustrated in FIG. 6 through formula manipulation. The conditional expression includes loop variable conditions indicating the ranges of i0, i1, j0, and j1, and an error condition indicating that parallelization is not possible. The loop variable conditions are defined as follows based on the loop definition descried in the source code. The values i0, i1, j0, and j1 are greater than or equal to the constant 0 and are less than or equal to N−1. The value i0 is equal to i1, and j0 is not equal to j1. The error condition is defined as follows based on the array reference descried in the source code. The value j0+X is equal to j1+Y.

The information processing apparatus 100 may eliminate i0, i1, j0, and j1 from this conditional expression through formula manipulation, and thus generates a determination expression for the parameters N, X, and Y. As formula manipulation, "projection" such as the Fourier-Motzkin elimination method or the like may be used. Note that, as mentioned above, in the second embodiment, it is assumed that the initial value and the final value of the loop variable are represented by a linear expression including the loop variable of the outer loop, a parameter, and a constant; the incremental step of the loop variable is a constant; and the index is represented by a linear expression including the loop variable, a parameter, and a constant.

Figure 7:
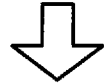
FIG. 7 illustrates an example of optimizing determination expressions.

FIG. 7 illustrates an example of optimizing determination expressions.

In the above description, the determination expression for checking memory access and the determination expression for checking whether parallelization is possible have been illustrated. In some cases, both the determination expressions for these two purposes are generated for the same loop. These two determination expressions often include the same parameter, and therefore often include a common logical expression. Thus, the information processing apparatus 100 extracts a common logical expression, and optimizes the determination expressions so as to reduce the number of determination steps. This improves the execution efficiency of the program.

For example, it is assumed that a determination expression 1<=Z and L<=Z is generated for a loop dependent on parameters L and Z, in the way illustrated in FIGS. 3 and 4. Further, it is assumed that a determination expression 1<=Z and L−1<=2Z is generated for the same loop, in the way illustrated in FIGS. 5 and 6. These two determination expressions include a common logical expression 1<=Z. Thus, the information processing apparatus 100 generates check code that first evaluates the logical expression 1<=Z and, only when the logical expression 1<=Z is satisfied, evaluates the logical expression L<=Z and the logical expression L−1<=2Z. By sharing the evaluation of the logical expression 1<=Z, it is possible to reduce the number of determination steps.

Next, a description will be given of the configuration of the information processing apparatus 100 and the compilation procedure.

Figure 8:
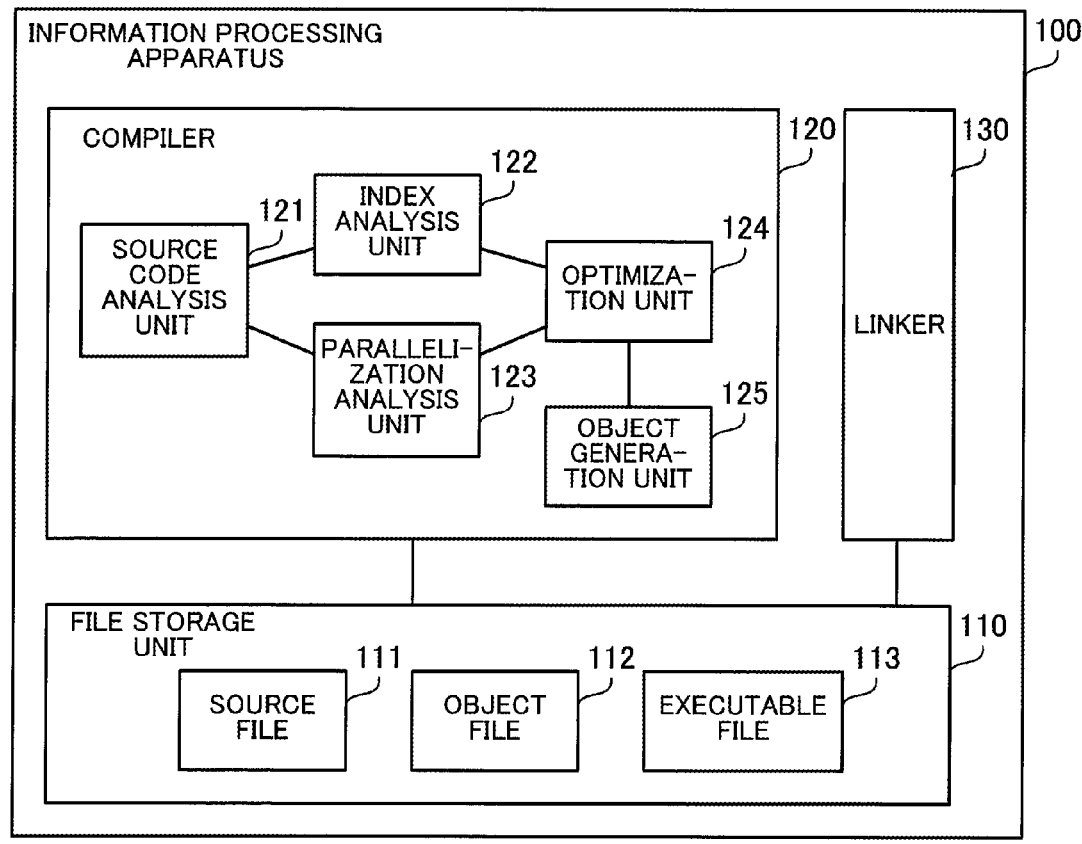
FIG. 8 is a block diagram illustrating an example of software that runs on the information processing apparatus.

FIG. 8 is a block diagram illustrating an example of software that runs on the information processing apparatus 100.

The information processing apparatus 100 includes a file storage unit 110, a compiler 120, and a linker 130. The file storage unit 110 is implemented as a storage area reserved in the RAM 103 or the HDD 104, for example. The compiler 120 and the linker 130 are realized as modules of software executed by the CPUs 101 and 102.

The file storage unit 110 stores a source file 111, an object file 112, and an executable file 113. The source file 111 is a file including source code written in a high-level language such as C and the like. The source file 111 may be created by the user using the input device 22, or may be transmitted to the information processing apparatus 100 from another information apparatus via the network 24. The object file 112 is a file including object code written in a machine language that is directly understandable by a CPU. The object code is generated by compiling the source code. The executable file 113 is an executable program module, and is generated from the object file 112. The executable file 113 may be executed by the information processing apparatus 100, or may be transmitted to and executed by another information processing apparatus.

The compiler 120 acquires the source file 111 from the file storage unit 110, and compiles the source code included in the source file 111. Then, the compiler 120 generates object code corresponding to the source code, and stores the object file 112 including the generated object code in the file storage unit 110. The compiler 120 includes a source code analysis unit 121, an index analysis unit 122, a parallelization analysis unit 123, an optimization unit 124, and an object generation unit 125.

The source code analysis unit 121 analyzes source code and recognizes the control structure indicating operation instructions and the execution order of the operation instructions represented by the source code. The control structure includes a loop, an unconditional branch, a conditional branch, a subroutine call, and the like. The analysis performed by the source code analysis unit 121 includes, for example, lexical analysis, syntax analysis, semantic analysis, and the like.

The index analysis unit 122 analyzes the loop recognized by the source code analysis unit 121 so as to determine whether the index value of the array is in the domain. If the index value is statically determined to be outside the domain, the index analysis unit 122 determines a compilation error. On the other hand, if it is not statically known whether the index value is outside the domain, the index analysis unit 122 outputs a determination expression for dynamically checking this at run time of the executable file 113. Note that if the index value is statically determined to be in the domain, the index analysis unit 122 does not have to output a determination expression.

The parallelization analysis unit 123 analyzes a loop with a parallelization directive among loops recognized by the source code analysis unit 121 so as to determine whether the array reference is parallelizable. If parallelization is statically determined not to be possible, the parallelization analysis unit 123 determines a compilation error. On the other hand, if it is not statically known whether parallelization is possible, the parallelization analysis unit 123 outputs a determination expression for dynamically checking this at run time of the executable file 113. Note that if parallelization is statically determined to be possible, the parallelization analysis unit 123 does not have to output a determination expression.

The optimization unit 124 generates, for each loop, check code to be inserted immediately before the loop, using the determination expressions that are output by the index analysis unit 122 and the parallelization analysis unit 123. If only one of the index analysis unit 122 and the parallelization analysis unit 123 has output a determination expression for a loop, the optimization unit 124 generates check code that performs error processing when the determination expression is satisfied. On the other hand, if both the index analysis unit 122 and the parallelization analysis unit 123 have output determination expressions for the same loop, the optimization unit 124 examines whether the two determination expressions include a common logical expression, and optimizes the determination expressions so as to make the determination expressions shorter. Then, the optimization unit 124 generates check code that performs error processing when the optimized determination expressions are satisfied.

The object generation unit 125 generates object code corresponding to the source code, based on the analysis result by the source code analysis unit 121. In this step, the object generation unit 125 inserts the check code generated by the optimization unit 124 immediately before the loop.

The linker 130 acquires the object file 112 from the file storage unit 110, and searches for other object files and libraries that are referred to from the object code included in the object file 112. Then, the linker 130 links the object file 112 with the other object files and libraries so as to generate the executable file 113. Note that the compiler 120 may have the function of the linker 130.

Figure 9:
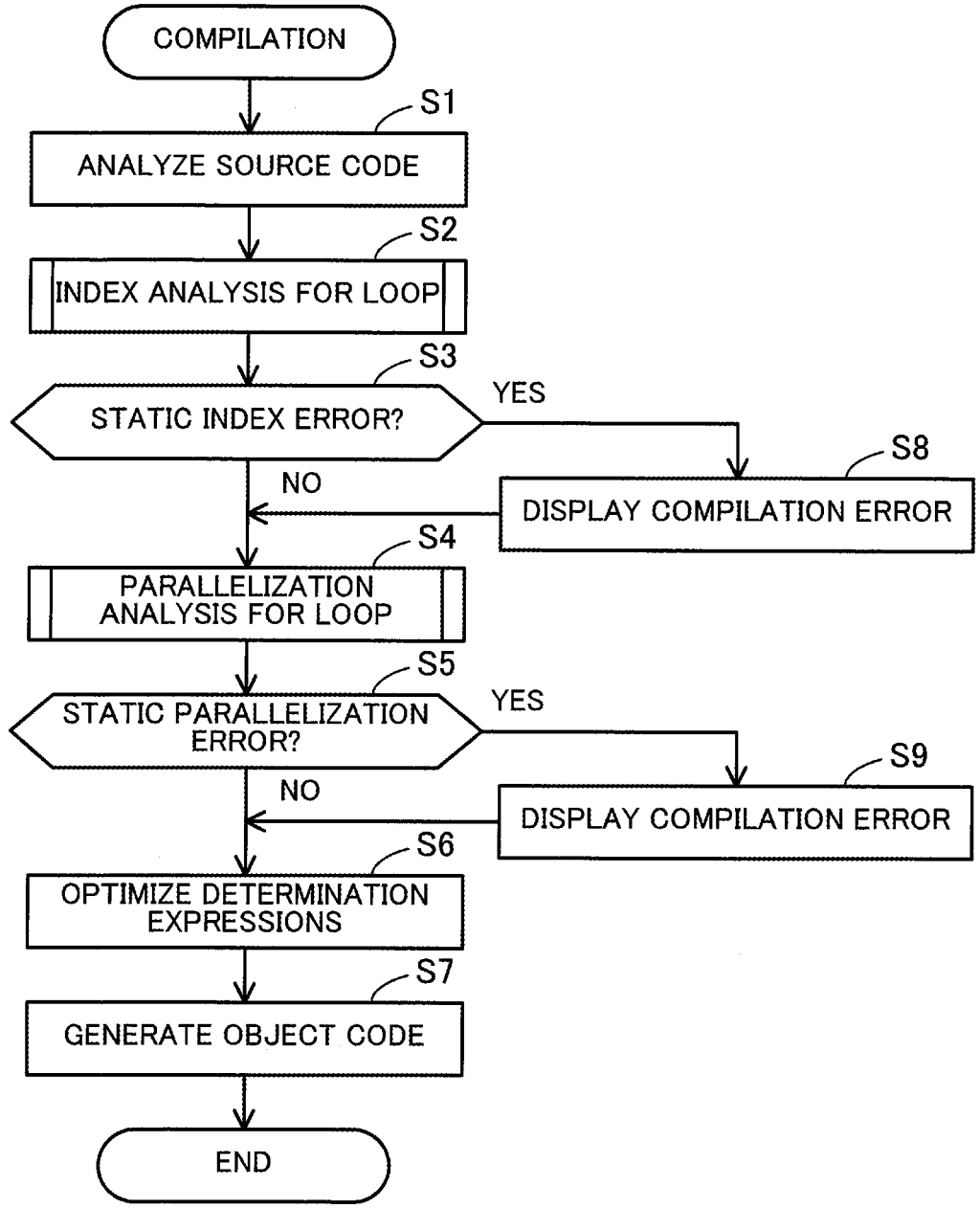
FIG. 9 is a flowchart illustrating an example of the procedure of compilation.

FIG. 9 is a flowchart illustrating an example of the procedure of compilation.

(S1) The source code analysis unit 121 analyzes the source code included in the source file 111. In this step, loops written in the source code are recognized.

(S2) The index analysis unit 122 performs index analysis for each of the loops recognized in step S1. With the index analysis, a determination expression representing a parameter condition in which an array reference in a loop causes a memory access violation is often generated for part or all of the loops recognized in step S1. The details of the index analysis will be described below.

(S3) The index analysis unit 122 determines whether at least one of the determination expressions generated in step S2 indicates a static index error. The index analysis unit 122 outputs the generated determination expressions to the optimization unit 124. If a static index error is indicated, the process proceeds to step S8. If not, the process proceeds to step S4.

(S4) The parallelization analysis unit 123 performs parallelization analysis for loops with parallelization directives among the loops recognized in step S1. With the parallelization analysis, a determination expression representing a parameter condition in which an array reference in a loop is parallelizable is often generated for part or all of the loops with parallelization directives. The details of the parallelization analysis will be described below.

(S5) The parallelization analysis unit 123 determines whether at least one of the determination expressions generated in step S4 indicates a static parallelization error. The parallelization analysis unit 123 outputs the generated determination expressions to the optimization unit 124. If a static parallelization error is indicated, the process proceeds to step S9. If not, the process proceeds to step S6. Note that a set of the steps S2, S3 and S8 and a set of the steps S4, S5, and S9 may be performed in the reverse order to the order described above, or may be performed in parallel.

(S6) The optimization unit 124 classifies the determination expressions output in step S3 and the determination expressions output in step S5 by loop, and optimizes the determination expressions. If both the index analysis unit 122 and the parallelization analysis unit 123 have output determination expressions for the same loop, the optimization unit 124 searches for a common logical expression included in the two determination expressions. If there is no common logical expression, the optimization unit 124 does not have to change the determination expressions. On the other hand, if there is a common logical expression, the optimization unit 124 modifies logical expressions included in the determination expressions such that the common logical expression is evaluated only once.

(S7) The optimization unit 124 generates check code including the determination expressions optimized in step S6 for part or all of the loops recognized in step S1. The object generation unit 125 generates object code that causes the check code to be executed immediately before the loop. The object generation unit 125 stores the object file 112 including the generated object code in the file storage unit 110. Thus, the compilation ends.

(S8) The index analysis unit 122 outputs a message indicating a compilation error. For example, the index analysis unit 122 displays a message indicating a compilation error on the display 21. Then, the process proceeds to step S4.

(S9) The parallelization analysis unit 123 outputs a message indicating a compilation error. For example, the parallelization analysis unit 123 displays a message indicating a compilation error on the display 21. Then, the process proceeds to step S6.

Figure 10:
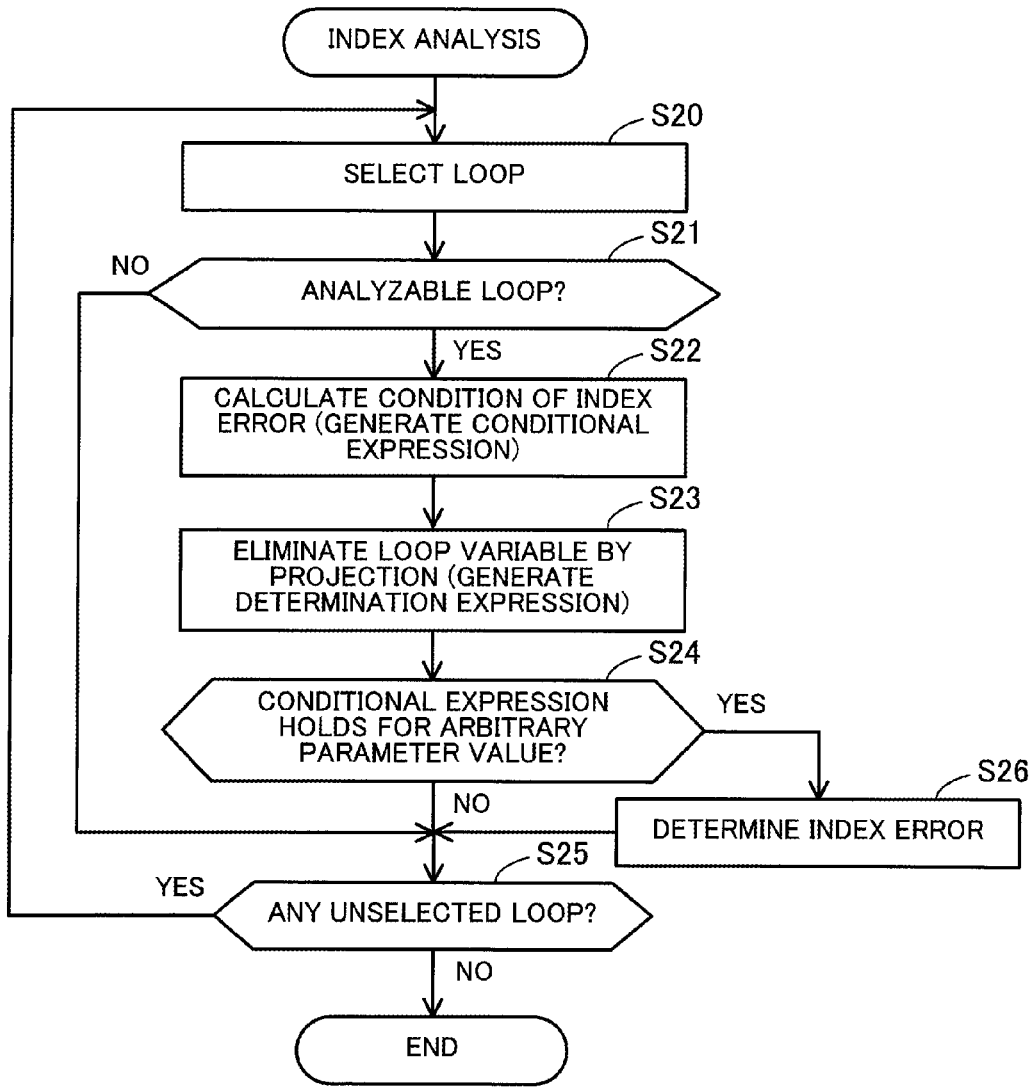
FIG. 10 is a flowchart illustrating an example of the procedure of index analysis.

FIG. 10 is a flowchart illustrating an example of the procedure of index analysis.

The process illustrated in this flowchart is performed in the above step S2.

(S20) The index analysis unit 122 selects one of the loops.

(S21) The index analysis unit 122 determines whether the loop selected in step S20 is analyzable by index analysis. The loop is analyzable by index analysis if the region in the n-dimensional space representing the variation ranges of the loop variables and the parameter is a convex polyhedron. The loop is analyzable by index analysis if the initial value and the final value of the loop variable are represented by a linear expression including the loop variable of the outer loop, a parameter, and a constant; the incremental step of the loop variable is a constant; and the index is represented by a linear expression including the loop variable, a parameter, and a constant. If the loop is analyzable by index analysis, the process proceeds to step S22. If not, the process proceeds to step S25.

(S22) The index analysis unit 122 generates a conditional expression indicating that an index error occurs, based on the description of the source code. The conditional expression includes loop variable conditions and an error condition as illustrated in FIG. 4. The error condition indicates that the index value is outside the domain declared at the time of defining the array. The loop variable conditions and error condition may be represented as linear inequalities using the loop variables and parameters.

(S23) The index analysis unit 122 eliminates the loop variables from the conditional expression generated in step S22 through formula manipulation, and generates a determination expression indicating the range of values of the parameter when the conditional expression holds. However, as mentioned above, if the conditional expression always holds regardless of the parameter value, there might be no parameter in the conditional expression. As formula manipulation, a projection algorithm such as the Fourier-Motzkin elimination method or the like is used.

(S24) The index analysis unit 122 determines whether the determination expression generated in step S23 indicates that the conditional expression always holds regardless of the value of the parameter. If the determination expression always holds, no parameter might appear in the determination expression. If the condition is satisfied, the process proceeds to step S26. If not, the process proceeds to step S25.

(S25) The index analysis unit 122 determines whether there is a loop that has not been selected in step S20. If there is a loop that has not been selected, the process returns to step S20. If all the loops have been selected, the index analysis ends.

(S26) When the determination expression always holds, it indicates that the array reference in the loop always cause a memory access violation. Therefore, the index analysis unit 122 determines that there is a static index error in the loop. Then, the process proceeds to step S25.

Figure 11:
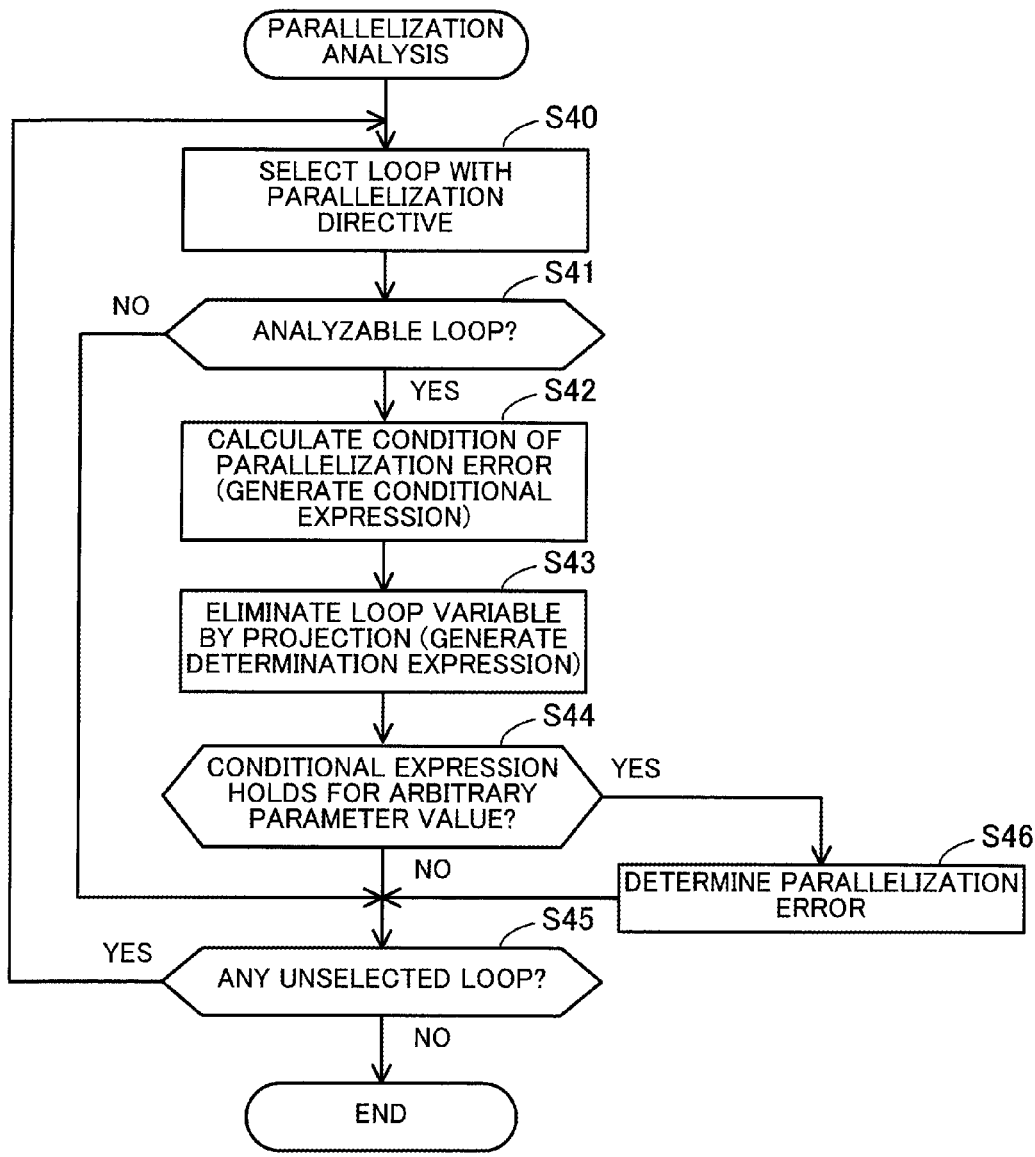
FIG. 11 is a flowchart illustrating an example of the procedure of parallelization analysis.

FIG. 11 is a flowchart illustrating an example of the procedure of parallelization analysis.

The process illustrated in this flowchart is performed in the above step S4.

(S40) The parallelization analysis unit 123 selects one of the loops with parallelization directives.

(S41) The parallelization analysis unit 123 determines whether the loop selected in step S40 is analyzable by parallelization analysis. As in the case of index analysis, the loop is analyzable by parallelization analysis if the region in the n-dimensional space representing the variation ranges of the loop variables and the parameter is a convex polyhedron. The loop is analyzable by parallelization analysis if the initial value and the final value of the loop variable are represented by a linear expression including the loop variable of the outer loop, the parameter, and a constant; the incremental step of the loop variable is a constant; and the index is represented by a linear expression including the loop variable, the parameter, and a constant. If the loop is analyzable by parallelization analysis, the process proceeds to step S42. If not, the process proceeds to step S45.

(S42) The parallelization analysis unit 123 generates a conditional expression indicating that a parallelization error occurs, based on the description of the source code. The conditional expression includes loop variable conditions and an error condition as illustrated in FIG. 6. The error condition indicates that, in the j0-th operation and j1-th operation to be parallelized, the same array is referenced using the same index value. Note that at least one of the array reference in the j0-th operation and the array reference in the j1-th operation includes updating a data element. The loop variable conditions and error condition may be represented as linear inequalities (and linear equations) using loop variables and parameters.

(S43) The parallelization analysis unit 123 eliminates the loop variables from the conditional expression generated in step S42 through formula manipulation, and generates a determination expression indicating the range of values of the parameter when the conditional expression holds. However, as mentioned above, if the conditional expression always holds regardless of the parameter value, there might be no parameter in the conditional expression. As formula manipulation, a projection algorithm such as the Fourier-Motzkin elimination method or the like is used.

(S44) The parallelization analysis unit 123 determines whether the determination expression generated in step S43 indicates that the conditional expression always holds regardless of the value of the parameter. If the determination expression always holds, no parameter might appear in the determination expression. If the condition is satisfied, the process proceeds to step S46. If not, the process proceeds to step S45.

(S45) The parallelization analysis unit 123 determines whether there is a loop that has not been selected in step S40. If there is a loop that has not been selected, the process returns to step S40. If all the loops have been selected, the parallelization analysis ends.

(S46) When the determination expression always holds, it indicates that parallelization of the array reference in the loop is always impossible. Therefore, the parallelization analysis unit 123 determines that the addition of the parallelization directive is inappropriate and there is a static parallelization error in the loop. Then, the process proceeds to step S45.

According to the information processing apparatus 100 of the second embodiment, a conditional expression is generated which includes one or more linear expressions indicating the variation range of a loop variable and a linear expression indicating that the index value of an array is outside its domain. The loop variable is eliminated from this conditional expression by projection, and thus a determination expression indicating the range of values of a parameter is generated. Based on this determination expression, it is checked immediately before the loop whether the loop may be executed. Thus, compared to the case where checking is performed in the loop, it is possible to reduce the number of times the check code is executed, and to improve the execution efficiency of the program by reducing the overhead of the checking. Further, even for a loop having a complex loop definition, such as a nested loop using multiple loop variables and the like, it is possible to generate a determination expression for a parameter.

Further, according to the information processing apparatus 100, a conditional expression is generated which includes one or more linear expressions indicating the variation range of a loop variable and a linear expression indicating that operations to be parallelized use the same data element. The loop variable is eliminated from this conditional expression by projection, and thus a determination expression indicating the range of a parameter is generated. Based on this determination expression, it is checked immediately before the loop whether the loop may be executed in parallel. Thus, even for a loop having a complex loop definition, such as a nested loop using multiple loop variables and the like, it is possible to generate a determination expression for a parameter.

As mentioned above, the information processing in the first embodiment may be realized by causing the information processing apparatus 10 to execute a program. Further, the information processing in the second embodiment may be realized by causing the information processing apparatus 100 to execute a program.

The program may be recorded in a computer-readable storage medium (for example, the storage medium 23). Examples of storage media include magnetic disks, optical discs, magneto-optical disks, semiconductor memories, and the like. Magnetic disks include FD and HDD. Optical discs include CD, CD-Recordable (CD-R), CD-Rewritable (CD-RW), DVD, DVD-R, and DVD-RW. The program may be stored in a portable storage medium so as to be distributed. In this case, the program may be copied (installed) from the portable storage medium to another storage medium such as an HDD or the like (for example, the HDD 104) so as to be executed.

According to an aspect, it is possible to increase the number of items that may be checked before the loop, with respect to an array reference in a loop.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store source code including loop processing, the loop processing being written with an array referenced by an index including a loop variable and a parameter whose value is dynamically determined before the loop processing and remains constant during the loop processing; and
a processor configured to execute a process including:
generating a conditional expression indicating that the index of the array satisfies a predetermined condition, using the loop variable and the parameter,
generating a determination expression that gives an allowable range of the parameter, by eliminating the loop variable from the conditional expression through formula manipulation,
generating object code corresponding to the source code, and
inserting check code before the loop processing in the object code, so as to test whether the value of the parameter at run time falls within the allowable range given by the determination expression.

2. The information processing apparatus according to claim 1, wherein the process further includes generating another determination expression corresponding to another conditional expression for the loop processing, combining the determination expression and said another determination expression to obtain a combined determination expression, and generating check code based on the combined determination expression.

3. The information processing apparatus according to claim 1, wherein the process further includes generating warning information when the determination expression indicates that the conditional expression holds or does not hold regardless of a value of the parameter.

4. The information processing apparatus according to claim 1, wherein the generating the conditional expression includes generating the conditional expression which includes a plurality of first linear expressions indicating bounds of a value of the loop variable, and a second linear expression indicating that the index of the array satisfies the predetermined condition.

5. The information processing apparatus according to claim 1, wherein the predetermined condition includes at least one of a condition on whether a value of the index is within a domain and a condition on whether a reference to the array is parallelizable.

6. A compilation method comprising:
acquiring, by a processor, source code including loop processing, the loop processing being written with an array referenced by an index including a loop variable and a parameter whose value is dynamically determined before the loop processing and remains constant during the loop processing;
generating, by the processor, a conditional expression indicating that the index of the array satisfies a predetermined condition, using the loop variable and the parameter;
generating, by the processor, a determination expression that gives an allowable range of the parameter, by eliminating the loop variable from the conditional expression through formula manipulation;
generating, by the processor, object code corresponding to the source code; and
inserting, by the processor, check code before the loop processing in the object code, so as to test whether the value of the parameter at run time falls within the allowable range given by the determination expression.

7. A computer-readable storage medium storing a computer program that causes a computer to execute a process comprising:
acquiring source code including loop processing, the loop processing being written with an array referenced by an index including a loop variable and a parameter whose value is dynamically determined before the loop processing and remains constant during the loop processing;
generating a conditional expression indicating that the index of the array satisfies a predetermined condition, using the loop variable and the parameter;
generating a determination expression that gives an allowable range of the parameter, by eliminating the loop variable from the conditional expression through formula manipulation;
generating object code corresponding to the source code; and
inserting check code before the loop processing in the object code, so as to test whether the value of the parameter at run time falls within the allowable range given by the determination expression.

* * * * *